United States Patent
Wen et al.

(10) Patent No.: US 7,660,804 B2
(45) Date of Patent: Feb. 9, 2010

(54) JOINT OPTIMIZATION OF WRAPPER GENERATION AND TEMPLATE DETECTION

(75) Inventors: Ji-Rong Wen, Beijing (CN); Min Wan, Beijing (CN); Ruihua Song, Beijing (CN); Wei-Ying Ma, Beijing (CN); Shuyi Zeng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 11/465,026

(22) Filed: Aug. 16, 2006

(65) Prior Publication Data

US 2008/0046441 A1    Feb. 21, 2008

(51) Int. Cl.
G06F 7/00 (2006.01)
G06F 17/00 (2006.01)
(52) U.S. Cl. ..................... 707/100
(58) Field of Classification Search ................. 707/100; 715/234
See application file for complete search history.

(56) References Cited

U.S. PATENT DOCUMENTS

| | | | |
|---|---|---|---|
| 6,135,650 A | 10/2000 | Goebel | |
| 6,304,870 B1 | 10/2001 | Kushmerick et al. | |
| 6,446,061 B1 * | 9/2002 | Doerre et al. | 707/3 |
| 6,606,625 B1 * | 8/2003 | Muslea et al. | 707/6 |
| 6,654,739 B1 * | 11/2003 | Apte et al. | 707/5 |
| 6,757,678 B2 * | 6/2004 | Myllymaki | 707/6 |
| 6,792,576 B1 | 9/2004 | Chidlovskii | |
| 6,941,558 B2 | 9/2005 | Hill et al. | |
| 7,203,679 B2 * | 4/2007 | Agrawal et al. | 707/6 |
| 2002/0174161 A1 | 11/2002 | Scheetz et al. | |
| 2004/0093321 A1 | 5/2004 | Roustant et al. | |
| 2004/0111400 A1 | 6/2004 | Chevalier | |
| 2005/0022115 A1 | 1/2005 | Baumgartner et al. | |
| 2005/0154979 A1 * | 7/2005 | Chidlovskii et al. | 715/513 |

(Continued)

FOREIGN PATENT DOCUMENTS

WO    WO-2005/072072 A2    4/2006

(Continued)

OTHER PUBLICATIONS

PCT International Search Report under International Application No. PCT/US2007/018417, Mailing date Feb. 1, 2008, 3 pages.

(Continued)

Primary Examiner—Mohammad Ali
Assistant Examiner—Alexey Shmatov
(74) Attorney, Agent, or Firm—Perkins Coie LLP

(57) ABSTRACT

A method and system for generating wrappers for hierarchically organized documents by jointly optimizing template detection and wrapper generation is provided. A wrapper generation system generates a wrapper for documents with similar templates by identifying a cluster of document trees and generating a wrapper tree for the cluster. A wrapper tree defines the wrapper for documents that match the template of the cluster. The wrapper generation system clusters document trees by generating a wrapper tree for the cluster based on an initial document tree. The wrapper generation system then repeatedly determines whether any other document tree matches or nearly matches the wrapper tree for the cluster and, if so, adds the document tree to the cluster and adjusts the wrapper tree as appropriate so that all the document trees, including the newly added one, match the wrapper tree.

11 Claims, 13 Drawing Sheets

U.S. PATENT DOCUMENTS

2007/0005589 A1* 1/2007 Gollapudi ...................... 707/5
2008/0010292 A1* 1/2008 Poola .......................... 707/10

FOREIGN PATENT DOCUMENTS

WO     WO-2006/036376 A1     4/2006

OTHER PUBLICATIONS

Arasu, Arvind and Hector Garcia-Molina, "Extracting Structured Data from Web Pages," SIGMOD 2003, San Diego, CA, © 2003 ACM, pp. 337-348.

Chang, Chia-Hui and Shao-Chen Lui, "IEPAD: Information Extraction Based on Pattern Discovery," WWW10, May, Hong Kong, © 2001 ACM, pp. 681-688.

Chuang, Shui-Lung and Jane Yung-jen Hsu, "Tree-Structured Template Generation for Web Pages," Proceedings of the IEEE/WIC/ACM International Conference on Web Intelligence (WI'04), IEEE Computer Society, 7 pages, 2004.

Cohen, William W. et al., "A Flexible Learning System for Wrapping Tables and Lists in HTML Documents," WW2002, Honolulu, Hawaii, ACM, pp. 232-241.

Crescenzi, Valter, Giansalvatore Mecca and Paolo Merialdo, "RoadRunner: Towards Automatic Data Extraction from Large Web Sites," Proceedings of the 27th VLDB Conference, Italy, 2001, 10 pages.

Crescenzi, Valter, Giansalvatore Mecca and Paolo Merialdo, "Wrapping-Oriented Classification of Web Pages," SAC 2002, Madrid, Spain, © 2002 ACM, pp. 1108-1112.

Flesca, Sergio et al., "Web wrapper induction: a brief survey," AI Communications 17, 2004, © 2004 IOS Press, pp. 57-61.

Fukunaga, K., "Introduction to statistical pattern recognition," Academic Press Inc., Boston, 1990, 32 pages.

Hammer, J. et al., "Extracting Semistructured Information from the Web," In Proceedings of the Workshop on Management for Semistructured Data, 1997, 8 pages.

Hao, Yanan and Yanchun Zhang, "A Two-Phase Rule Generation and Optimization Approach for Wrapper Generation," 17th Australasian Database Conference, 2006, © 2006 Australian Computer Society, Inc., 10 pages.

Hogue, Andrew and David Karger, "Thresher: Automating the Unwrapping of Semantic Content from the World Wide Web," WWW2005, Chiba, Japan, ACM, pp. 86-95.

Hsu, Chun-Nan and Ming-Tzung Dung, "Generating Finite-State Transducers for Semi-Structured Data Extraction from the Web," Information Systems, vol. 23, No. 8, 1998, © 1998 Elsevier Science Ltd., pp. 521-538.

Irmak, Utku and Torsten Suel, "Interactive Wrapper Generation with Minimal User Effort," WWW2006, Edinburgh, Scotland, 2006, ACM, 11 pages.

Kushmerick, Nicholas, Daniel S. Weld and Robert Doorenbos, "Wrapper Induction for Information Extraction," IJCAI-97, 7 pages, 1997.

Laender, Alberto H. F. et al., "A Brief Survey of Web Data Extraction Tools," SIGMOD Record, vol. 31, No. 2, Jun. 2002, pp. 84-93.

Liu, Bing and Kevin Chen-Chuan Chang, "Editorial: Special Issue on Web Content Mining," SIGKDD Explorations, vol. 6, Issue 2, pp. 1-4, 2004.

Liu, Bing, "Web Content Mining," WWW-2005 Tutorial, 14th International World Wide Web Conference (WWW-2005), May 2005, Chiba, Japan, 83 pages.

Liu, Bing, Robert Grossman & Yanhong Zhai, "Mining Data Records in Web Pages," SIGKDD'03, Washington, DC, © 2003 ACM, pp. 601-606.

Liu, Ling, Calton Pu and Wei Han, "XRAP: An XML-enabled Wrapper Construction System for Web Information Sources," Proceedings of the 16th International Conference on Data Engineering, 2000, pp. 611-621.

Muslea, Ion, Steve Minton and Craig Knoblock, "A Hierarchical Approach to Wrapper Induction," Autonomous Agents'99, Seattle, Washington, © ACM 1999, pp. 190-197.

Reis, Davi de Castro et al., "Automatic Web News Extraction Using Tree Edit Distance," WWW2004, May, New York, ACM, pp. 502-511.

Sarawagi, Sunita, "Automation in Information Extraction and Integration," Tutorial, VLDB 2002, 58 pages.

Willett, Peter, "Recent Trends in Hierarchic Document Clustering: A Critical Review," Information Processing & Management, vol. 24, No. 5, 1988, pp. 577-597.

Zhao, Hongkun et al., "Fully Automatic Wrapper Generation for Search Engines," WWW 2005, Chiba, Japan, ACM, pp. 66-86.

* cited by examiner

JOINT OPTIMIZATION OF WRAPPER GENERATION AND TEMPLATE DETECTION

BACKGROUND

The World Wide Web ("web") provides vast amounts of information that is accessible via web pages. Web pages can contain either static content or dynamic content. Static content refers generally to information that may stay the same across many accesses of the web pages. Dynamic content refers generally to information that is stored in a web database and is added to a web page in response to a search request. Dynamic content represents what has been referred to as the deep web or hidden web.

Many search engine services allow users to search for static content of the web. After a user submits a search request or query that includes search terms, the search engine service identifies web pages that may be related to those search terms. These web pages are the search result. To quickly identify related web pages, the search engine services may maintain a mapping of keywords to web pages. This mapping may be generated by "crawling" the web to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on.

These search engine services, however, do not in general provide for searching of dynamic content, which is also considered non-crawlable content. Many web pages contain dynamic content generated from a structured source (e.g., a relational database). When a web page containing such dynamic content is generated, the structured data of the underlying structured source is encoded in the web page in an unstructured or semi-structured manner. One problem with searching such dynamic content is that it is difficult to identify the schemas of the corresponding structured source from the web pages. A schema defines the information or attributes that are stored in the underlying structured source. Because of this difficulty, the querying of web pages with such dynamic content often provides unsatisfactory results.

Attempts have been made to identify the schema of the dynamic content of web pages so that the content may be transformed into a more structured format to facilitate searching. The extraction of information from web pages and organization of it in a structured format is performed by programs referred to as "wrappers." It can be time-consuming to manually generate a wrapper for web pages of a web site. Thus, it is impractical to manually generate wrappers for the millions of web pages of the thousands of web sites that provide dynamic content.

Some automatic wrapper "induction" or generation systems have been developed. Wrapper induction is the process of learning the schema of the dynamic content of a web page and generating a wrapper to extract the data from the web page and store the extracted data in a structured format identified by the schema. These automatic wrapper induction systems trade off effectiveness for expressiveness of the wrapper. Effectiveness refers to how accurate a wrapper is at extracting content from web pages that are not used in the wrapper induction process but that share the same "template." A wrapper induction system generates a wrapper for a template using a training set of web pages. The wrapper is then used to extract data from web pages that share the same template. Expressiveness refers to the scope of web pages that can be processed by a wrapper as identified by the wrapper's template. To make a wrapper more expressive, the wrapper induction systems generally introduce wildcards (e.g., "*") into the wrappers so that more web pages will be within the scope of a wrapper. In general, as the expressiveness of a wrapper increases, its effectiveness, however, decreases, and vice versa.

To provide an acceptable trade-off between effectiveness and expressiveness, the typical wrapper induction systems divide the training web pages into clusters according to templates representing the organization of the dynamic content on the web pages. Thus, web pages with a similar organization (i.e., having the same template) are clustered together. These wrapper induction systems can automatically generate wrappers for web pages within a cluster. Since the web pages of a cluster are similar, such wrappers can use limited wildcards to increase expressiveness and still attain acceptable effectiveness.

The accuracy of a wrapper generated by such typical wrapper induction systems, however, depends in large part on the accuracy of correctly clustering web pages that have the same template. Some wrapper induction systems simply cluster web pages based on similarity between the URLs of the web pages. This simple approach for clustering is appropriate when a web site stores web pages that use the same template in the same subdirectory of the web site. In such a case, their URLs have the same prefix to indicate the location of the subdirectory. Many web sites, however, use a much more complex approach when defining URLs for web pages. As a result, web pages with similar URLs may have very different templates, and web pages with very different URLs may have very similar templates. Thus, it can be very difficult to accurately cluster web pages based on similarity of their organization, resulting in wrappers with an unacceptable tradeoff between effectiveness and expressiveness.

SUMMARY

A method and system for generating wrappers for hierarchically organized documents by jointly optimizing template detection and wrapper generation is provided. A wrapper generation system dynamically generates wrappers for documents while it detects templates for the documents. The wrapper generation system represents documents as document trees with labeled leaf nodes. The wrapper generation system generates a wrapper for documents with similar templates by identifying a cluster of document trees and generating a wrapper tree for the cluster. A wrapper tree defines the wrapper for documents that match the template of the cluster. The wrapper generation system clusters document trees by generating a wrapper tree for the cluster based on an initial document tree. The wrapper generation system then repeatedly determines whether any other document tree matches or nearly matches the wrapper tree for the cluster and, if so, adds the document tree to the cluster and adjusts the wrapper tree as appropriate so that all the document trees, including the newly added one, match the wrapper tree. When no more document trees match or nearly match the wrapper tree, the generation of the wrapper tree for that cluster is complete. The wrapper generation system then repeats the process to form new clusters of document trees and generate their wrapper trees. The wrapper generation system then uses the wrapper trees to define the wrappers. To extract data of a new document, the document tree for the new document is created, the closest matching wrapper tree is identified, and the wrapper for that identified wrapper tree is used to extract the data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
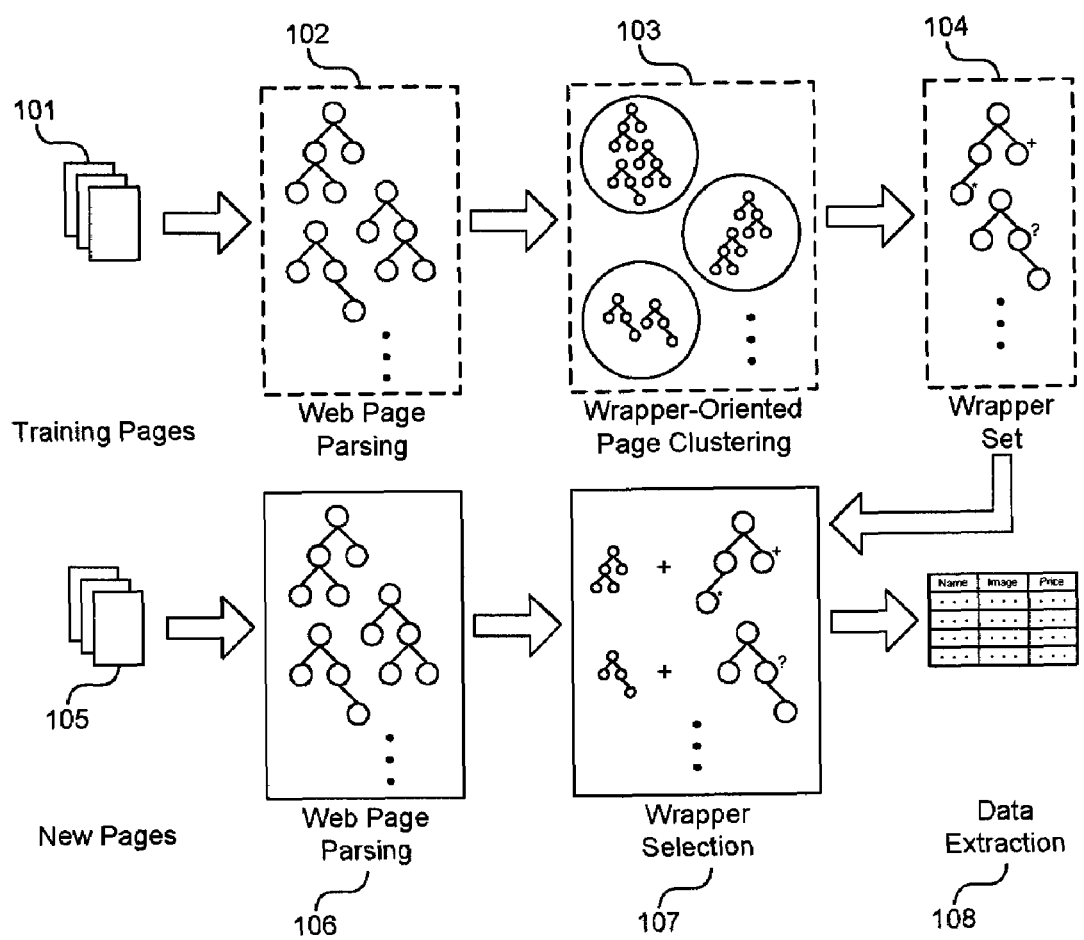
FIG. 1 is a block diagram that provides a high-level overview of the operation of the wrapper generation system in one embodiment.

A method and system for generating wrappers for hierarchically organized documents by jointly optimizing template detection and wrapper generation is provided. In one embodiment, a wrapper generation system dynamically generates wrappers for documents while it detects templates for the documents. The wrapper generation system is provided a collection of hierarchically organized documents, such as web pages, that are each represented by a tree structure of its hierarchy, referred to a document tree. For example, if the web pages conform to the Document Object Model ("DOM"), then the document trees contain nodes corresponding to the tags of the DOM document. The wrapper generation system is also provided with labels for the leaf nodes of the document trees. The labels correspond to identifiers, fields, or attributes of the underlying structured data. For example, a web page containing information on an automobile may have its leaf nodes labeled as "make," "model," "year," "color," "price," and so on. The wrapper generation system generates a wrapper for documents with similar templates by selecting a document tree of the collection and generating a wrapper tree corresponding to that document tree. A wrapper tree defines the wrapper for documents that match the detected template. The wrapper generation system determines whether any other document tree of the collection nearly matches the wrapper tree. If so, the wrapper generation system considers that document tree to share the same template as the document tree that was used to generate the wrapper. The wrapper generation system adjusts the wrapper tree for the document tree that nearly matches so that both document trees match the wrapper tree. If a document tree happens to exactly match the wrapper tree, then the wrapper generation system does not need to adjust the wrapper tree. The wrapper generation system then repeats the determining of whether any other document tree of the collection nearly matches the adjusted wrapper tree and the adjusting of the wrapper tree until no more document trees in the collection nearly match the adjusted wrapper tree. The document trees that are used to generate and adjust the wrapper tree are referred to as a "cluster" of document trees that have a similar template and that match the wrapper tree. The wrapper generation system then repeats the process of selecting a document tree to form a new cluster, generating a wrapper tree for that document tree, and dynamically adjusting the wrapper tree for nearly matching trees that are added to the cluster. In this way, the wrapper generation system detects templates based on dynamically generated wrapper trees and generates wrapper trees based on dynamically identified templates. The wrapper generation system then uses the wrapper trees to define the wrappers.

In one embodiment, the wrapper generation system uses a distance metric to determine whether a document tree matches or nearly matches a wrapper tree. A wrapper tree is a hierarchy of wrapper nodes that define document trees that have a similar template and represents a wrapper used to extract data from document trees that have that template. A wrapper node of a wrapper tree may contain a tag, label, or wildcard defining the corresponding document nodes of the document trees that match that node of the wrapper. To determine the distance between a document tree and a wrapper tree, the wrapper generation system aligns the document nodes with the wrapper nodes. The wrapper generation system then counts the number of tree nodes that are not aligned with wrapper nodes and the number of wrapper nodes that are not aligned with tree nodes. The wrapper generation system calculates the distance metric based on the number of misaligned nodes. The wrapper generation may also normalize the distance metric so that the same distance threshold can be used to define near matches between document trees and wrapper trees regardless of their size. For example, a document tree with five misaligned nodes may nearly match a wrapper tree with 100 nodes but not nearly match a wrapper tree with only 10 nodes.

In one embodiment, the wrapper generation system uses either a fixed threshold or an adaptive threshold to determine whether a document tree nearly matches a wrapper tree. When using a fixed threshold, the wrapper generation system uses the same threshold throughout the wrapper generation process to determine whether a document tree nearly matches a wrapper tree. When using an adaptive threshold, the wrapper generation system may initially use a small threshold when clustering document trees. When no more document trees nearly match the wrapper tree for the cluster, the wrapper generation system increases the threshold and then adds document trees to the cluster that nearly match the wrapper tree using the increased threshold and adjusting the wrapper tree accordingly. The wrapper generation system then tests whether the wrapper tree adjusted based on the increased threshold performs better than the wrapper tree with the previous threshold. The wrapper generation system may test the performance by extracting data from the document trees of the cluster using a wrapper based on the newly adjusted wrapper tree. If the performance is not significantly better, the wrapper generation system rolls back the effect of the increased threshold by setting the final cluster to exclude the document trees added because of the increased threshold and setting the final wrapper tree to the wrapper tree before being adjusted because of the increased threshold. If, however, the performance of the adjusted wrapper tree is better, the wrapper generation system then again increases the threshold and adds nearly matching document trees to the cluster. The wrapper generation system continues this process until the wrapper tree adjusted based on the increased threshold performs no better or not significantly better than the wrapper tree with the previous threshold.

FIG. 1 is a block diagram that provides a high-level overview of the operation of the wrapper generation system in one embodiment. The wrapper generation system is provided 101 with a training set of documents such as web pages. The wrapper generation system then parses 102 the web pages to generate the document trees and inputs the labels for their leaf nodes. The wrapper generation system jointly detects 103 the templates and generates 103 the wrappers by clustering the document trees based on dynamically adjusted wrapper trees. The wrapper generation system then outputs 104 the wrappers defined based on the wrapper trees. The wrapper generation system can then use the wrappers to extract data from web pages. When the wrapper generation system receives 105 a new web page, it parses 106 the new web page to generate a document tree. The wrapper generation system then selects 107 a wrapper tree that is closest to the generated document tree based on the distance metric and extracts 108 the data from the tree using the wrapper corresponding to the selected wrapper tree. In one embodiment, the documents may be represented in an XML format.

The wrapper generation system represents wrapper trees as modified DOM trees with a sign assigned to each wrapper node that may include "parentheses" nodes. The wrapper generation system uses the sign of a wrapper node to determine whether document nodes and wrapper nodes are aligned when calculating the distance between a document tree and a wrapper tree. The wrapper generation system defines the sign $S(\sigma)$ of a wrapper node $\sigma$ to be 1, an integer $N(N \geq 2)$, or one of the following wildcards: ?, +, *. A sign of 1 means the wrapper node can only match one tree node. A sign of N means that the wrapper node can only match N consecutive tree nodes. A sign of ? means that the wrapper node can only match zero or one tree node. A sign of + means that the wrapper node can match consecutive N tree nodes where $N \geq 1$. A sign of * means that the wrapper node can match zero or consecutive N tree nodes where $N \geq 1$. Wrapper nodes with a sign of ? or * are considered "soft" nodes because they can match no tree nodes. All other wrapper nodes are considered "hard" nodes. A wrapper tree may include a special node referred to as a "block" node. Parentheses nodes have no tags and act like pairs of parentheses and thus cannot be leaf nodes. All other nodes of a wrapper tree are referred to as "tag" nodes.

In one embodiment, the wrapper generation system normalizes the distance metric between a document tree and a wrapper tree based on weight of the document tree and the wrapper tree. The wrapper generation system defines the tree-node weight $W(\sigma)$ of a tree node $\sigma$ to be equal to the number of nodes of the sub-tree rooted at $\sigma$. The document tree weight $W(T_d)$ of a tree $T_d$ whose root node is $\tau$ is $W(\tau)$. The wrapper generation system defines the wrapper-node weight $W(\sigma)$ of wrapper node $\sigma$ to be 0 when the wrapper node is a soft node, to be the sum of the weights of its child nodes when the wrapper node is a hard node, to be 1 when the wrapper node is a hard leaf tag node, and to be 1 plus the sum of the weights of its child nodes when the wrapper node is a hard non-leaf tag node. The wrapper tree weight is $W(T_w)$ of wrapper tree $T_w$ is $W(T_d)$ when $T_w$ is generated by document tree $T_d$ and $\max(W(T_{w_1}), W(T_{w_2}))$ when wrapper tree $T_w$ is generated by the combination of wrapper trees $T_{w_1}$ and $T_{w_2}$.

Figure 2:
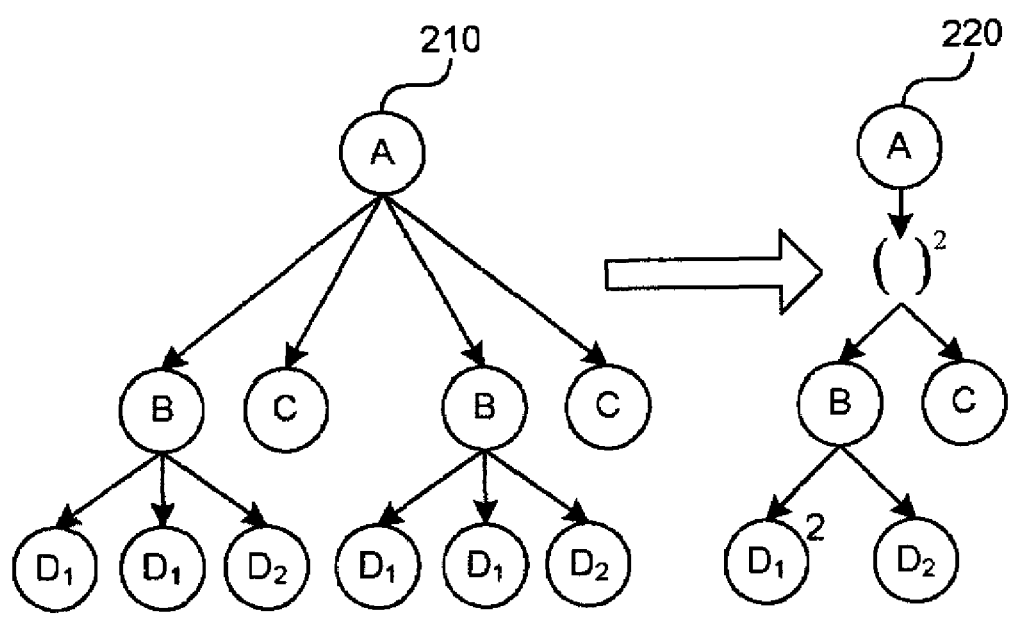
FIG. 2 illustrates the converting of a document tree to a wrapper tree.

The wrapper generation system defines a "wrapper level" as the number of document trees used to generate a wrapper tree. A level-1 wrapper tree is a wrapper tree generated by converting a document tree to a wrapper tree. The conversion of a document tree to a wrapper tree is represented by the following equation:

$$T_d \rightarrow T_w$$

where $T_d$ represents the document tree for document d and $T_w$ represents the wrapper tree for wrapper w. By definition, the weight of a level-1 wrapper is the weight of the document tree from which it is generated. When converting a document tree to a wrapper tree, the wrapper generation system performs a repeat-pattern-combination algorithm to make $T_w$ more concise than $T_d$. In one embodiment, the wrapper generation system uses an algorithm similar to that described in Liu, B., Grossman, R., and Zhai, Y., "Mining Data Records in Web Pages," Proceedings of the $9^{th}$ ACM SIGKDD International Conference on Knowledge Discovery and Data Mining, 2003, pp. 601-606, which is hereby incorporated by reference. If the algorithm detects identical consecutive sub-trees of a document node, the algorithm merges them into one wrapper node of the wrapper tree and sets its sign to the number of identical sub-trees. If the algorithm detects identical consecutive sub-forests of a document node, the algorithm merges them as one the sub-forest under a block node in the wrapper tree and sets its sign to the number of identical sub-forests. The algorithm considers the labels of leaf nodes when converting a document tree to a wrapper tree. FIG. 2 illustrates the converting of a document tree to a wrapper tree. The document tree 210 is converted to wrapper tree 220. Since the root node A of the document tree contains a repeated sub-forest of B and C nodes, the wrapper generation system adds a parentheses node X to the wrapper tree and sets its sign to 2. Since each B node contains consecutive nodes $D_1$ where the subscript represents the label of the node, the wrapper generation system combines those nodes in the wrapper tree and sets its sign to 2.

The wrapper generation system generates a high-level wrapper tree based on the alignment of two lower-level wrapper trees. The wrapper generation system aligns two wrapper trees $T_{w_1}$ and $T_{w_2}$ in a top-down order layer by layer. Nodes that are the same depth from the root node are in the same layer, and block nodes are not considered be in a layer. The wrapper generation system only aligns nodes that are in the same layer. The wrapper generation system considers wrapper nodes $\sigma_{w_1}$ and $\sigma_{w_2}$ to match when they satisfy the following conditions:

$\sigma_{w_1}$ and $\sigma_{w_2}$ are both non-leaf nodes or both leaf nodes, $T(\sigma_{w_1}) = T(\sigma_{w_2})$, If $\sigma_{w_1}$ and $\sigma_{w_2}$ are both leaf nodes, $L(\sigma_{w_1}) = L(\sigma_{w_2})$ where $T(\sigma)$ represents the tag of node $\sigma$ and $L(\sigma)$ represents the label of node $\sigma$. At each layer, the wrapper generation system performs a sequence alignment between the array of sub-trees $F_{w_1}$ and $F_{w_2}$ as represented by invoking an alignment function $A(F_{w_1}, F_{w_2})$. The wrapper generation system uses dynamic programming to obtain a minimal cost alignment.

All mismatched root nodes in $F_{w_1}$ and $F_{w_2}$ contribute their weight as cost to $A(F_{w_1}, F_{w_2})$. For a pair of matched nodes $\sigma_{w_2}$ and $\sigma_{w_2}$ that are non-leaf nodes, the wrapper generation system invokes $A(childF_{w_1}, childF_{w_2})$ recursively, where $childF_{w_1}$ and $childF_{w_2}$ are the sub-forests that consist of sub-trees rooted at the child nodes of $\sigma_{w_2}$ and $\sigma_{w_2}$. The wrapper generation system adds the cost calculated by invoking the function $A(childF_{w_1}, childF_{w_2})$ into the cost of $A(F_{w_1}, F_{w_2})$. Because the wrapper generation system aligns wrapper nodes in a top-down recursive way, it attempts to align nodes in two wrappers if and only if both of them are root nodes or their parent nodes are aligned with each other.

Figure 3:
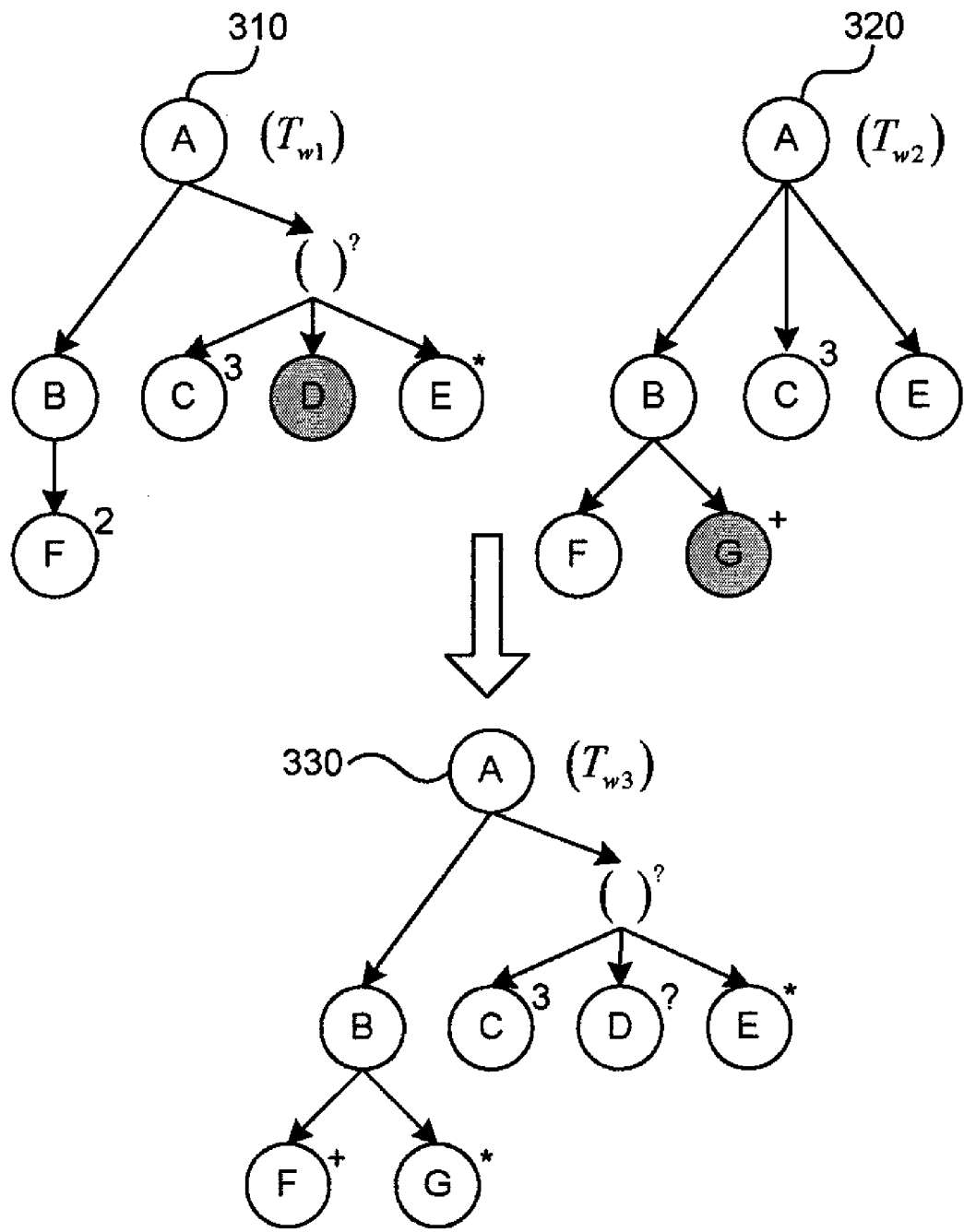
FIG. 3 is a diagram that illustrates the merging of wrapper trees in one embodiment.

FIG. 3 is a diagram that illustrates the merging of wrapper trees in one embodiment. The wrapper trees 310 and 320 are merged to form wrapper tree 330. Shaded nodes D and G have no matching node in the other wrapper tree. As a result, the corresponding wrapper nodes of the merged wrapper trees are soft nodes. The wrapper generation system initially invokes the alignment function as $A(A,A)$ passing the root nodes of the wrapper trees. The function recursively invokes itself as $A(B(C^3DE^*)?,BC^3E)$ passing wrapper nodes of the second layer. Because the wildcard ? is soft, the function recursively invokes itself as $A(BC^3DE^*,BC^3E)$ and $A(B,BC^3E)$. Since the former results in a lower cost (i.e., a better match), the function selects it as the alignment. During the dynamic programming process of function $A(B(C^3DE^*)?,BC^3E)$, the function $A(F^2, FG^+)$ is invoked recursively by both $A(BC^3DE^*,BC^3E)$ and $A(B,BC^3E)$ to calculate the cost of these two solutions. After the alignment obtains an optimal solution between two wrapper trees, the wrapper generation system constructs a new wrapper tree using the following sign generation function F:

$$F(1, NULL) = ? \mid F(?, N) = *$$
$$F(?, NULL) = ? \mid F(?, +) = *$$
$$F(n, NULL) = * \mid F(1, *) = *$$
$$F(+, NULL) = * \mid F(N, *) = *$$
$$F(*, NULL) = * \mid F(?, *) = *$$
$$F(1, 1) = 1 \mid F(+, *) = *$$
$$F(N, N) = N \mid F(1, N) = +$$
$$F(+, +) = + \mid F(N, +) = +$$
$$F(?, ?) = ? \mid F(1, +) = +$$
$$F(*, *) = * \mid F(N_1, N_2) = +$$
$$F(1, ?) = ? \mid$$

(1)

where NULL represents a mismatch of a wrapper node. For example, $F(1, NULL)$ indicates a mismatch of a wrapper node whose sign is 1.

The wrapper generation system aligns a document tree and a wrapper tree in a manner similar to how wrapper trees are aligned except as follows. Although wrapper trees are aligned in a 1-to-1 manner, a wrapper node (tag node only) whose sign is + or * can be aligned with more than one document node. Also, when determining whether two wrapper nodes can be aligned, the wrapper generation system does not take into account the label of a node. For alignment between wrapper tree $T_w$ and document tree $T_d$, the wrapper generation system uses $C_d(T_w, T_d)$ to indicate the total cost contributed by mismatched document nodes. $C_d$ represents the count of nodes of document tree $T_d$ that do not match wrapper nodes, and $C_w$ represents nodes of the wrapper tree $T_w$ that do not match document nodes. If $T_{w1} + T_{w2} \rightarrow T_{w3}$, then for any document tree $T_d$ the alignment between $T_{w3}$ and $T_d$ produces at least as many matched pairs as that between $T_{w1}$ and $T_d$ and that between $T_{w2}$ and $T_d$ because $T_{w3}$ has at least as many wildcards as $T_{w1}$ and $T_{w2}$. Also, wrapper nodes that appear in $T_{w3}$ but do not exist in both $T_{w1}$ and $T_{w2}$ are soft nodes and thus do not contribute to the cost. Thus, for any document tree $T_d$, the following conditions are satisfied:

$$C_w(T_{w3}, T_d) \leq C_w(T_{w1}, T_d)$$

$$C_d(T_{w3}, T_d) \leq C_d(T_{w1}, T_d)(i=1,2) \quad (2)$$

The wrapper generation system defines the distance between a wrapper tree $T_w$ and a document tree $T_d$ by the following equation:

$$\Psi(T_w, T_d) = \left(\frac{C_w(T_w, T_d)}{W(T_w)} + \frac{C_d(T_w, T_d)}{W(T_w)}\right) / 2 \quad (3)$$

This equation has the characteristic that for any wrapper tree $T_w$ and document tree $T_d$, $0 \leq \Psi(T_w, T_d) \leq 1$. Also, for any document tree $T_d$, the following condition is satisfied.

$$\Psi(T_{w3}, T_d) \leq \Psi(T_{w1}, T_d)(i=1,2) \quad (4)$$

Figure 4:
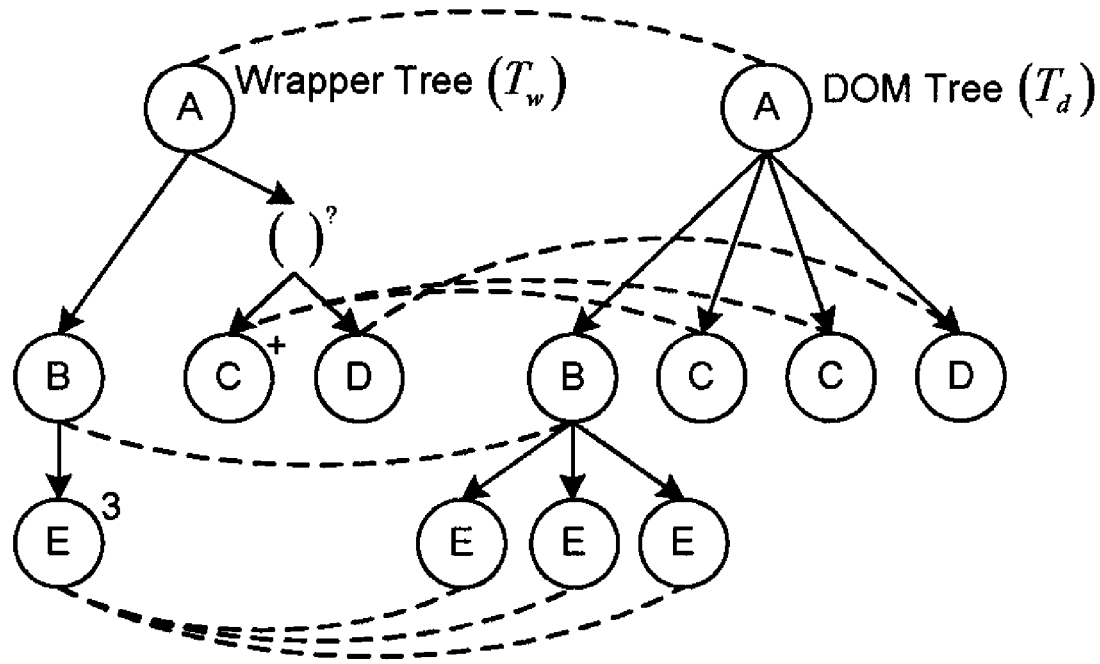
FIG. 4 is a diagram that illustrates the alignment of a wrapper tree and a document tree.

FIG. 4 is a diagram that illustrates the alignment of a wrapper tree and a document tree. The wrapper nodes and the document nodes are aligned as indicated by the dashed lines.

In one embodiment, the wrapper generation system uses an adaptive threshold when determining whether a document tree nearly matches a wrapper tree. The wrapper generation system initially starts out with a small threshold. When no document trees are within the current threshold, the wrapper generation system increases the threshold by a small amount. The wrapper generation system repeats the clustering until the increased threshold does not significantly increase the performance of the wrapper represented by the wrapper tree. The wrapper generation system evaluates the performance of the wrapper tree $T_w'$ generated under the increased threshold by testing the corresponding clustered document trees. The wrapper generation system then calculates the precision p, recall r, and F1 f of the previous wrapper tree and the current wrapper tree. The wrapper generation system may represent a significant improvement by the following equation:

$$f_{T_w'} > f_{T_w}$$

$$r_{T_w'} - r_{T_w} > \lambda \quad (5)$$

where $\lambda$ is a small value (e.g., 0.005) that is used to ensure that threshold increasing leads to a significant improvement of the recall of the generated wrapper. The wrapper generation system may also terminate the increasing at a threshold when it reaches a stop value defined to be between the initial threshold and 1.

Figure 5:
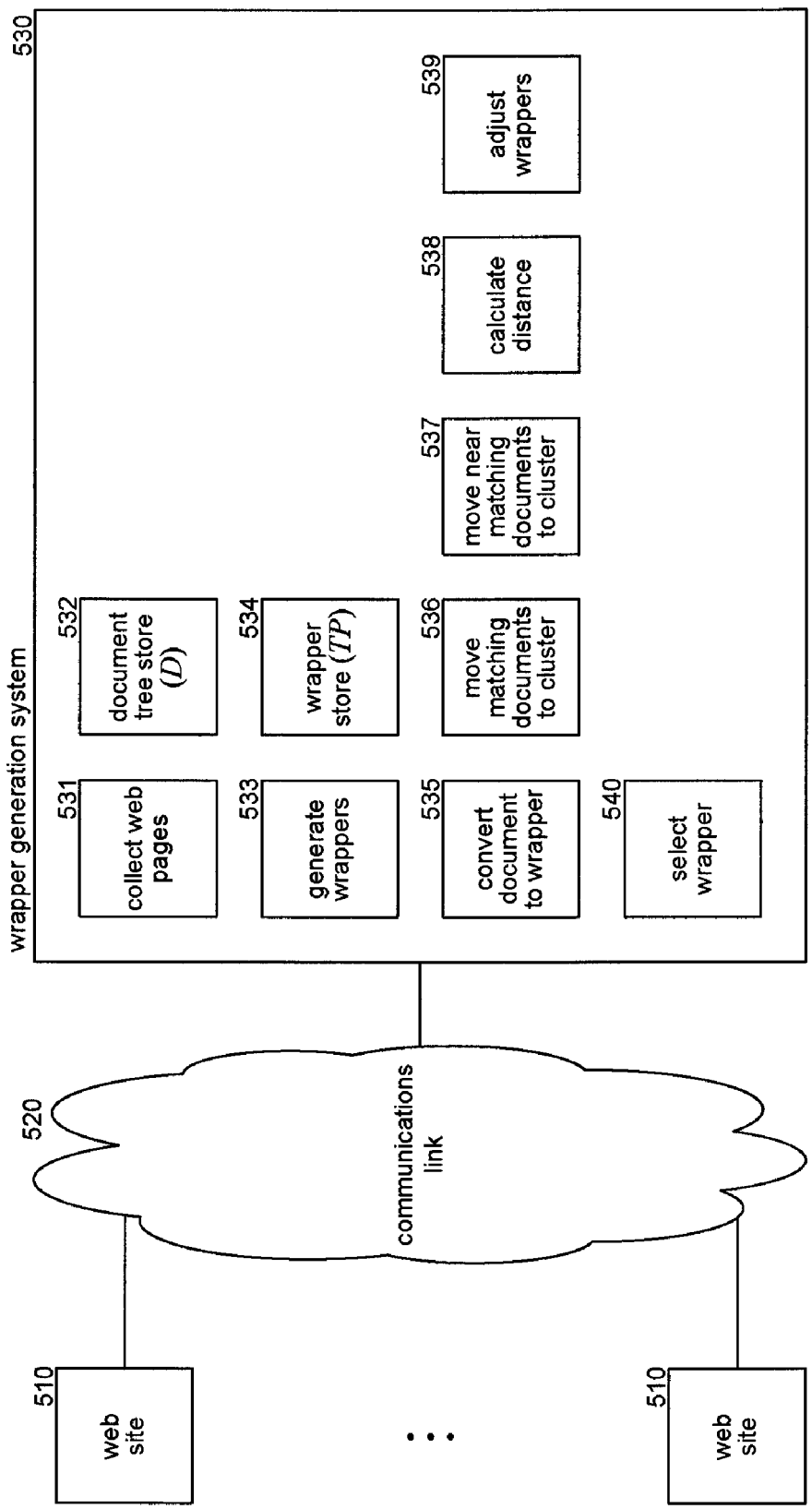
FIG. 5 is block diagram that illustrates components of the wrapper generation system in one embodiment.

FIG. 5 is a block diagram that illustrates components of the wrapper generation system in one embodiment. The wrapper generation system 530 is connected to web sites 510 via communications link 520. The wrapper generation system includes a collect web pages component 531 and a document tree store 532. The collect web pages component crawls various web sites to collect web pages as training data for generating the wrappers. The collect web pages component generates a document object model ("DOM") representation of each web page and stores the representations as document trees within the document tree store. The wrapper generation system may also provide a user interface for users to manually label leaf nodes of the document trees. The wrapper generation system stores the labels within the document tree store. Thus, the training data for the wrapper generation includes the document trees along with the labels of the leaf nodes. The wrapper generation system also includes a generate wrappers component 533 and a wrapper store 534. The generate wrappers component clusters web pages that share similar templates, generates wrapper trees for the training data of the tree store, and stores the wrapper trees in the wrapper store. The generate wrappers component dynamically clusters web pages that share similar templates and dynamically adjusts the wrapper tree during clustering. Thus, the web pages of a cluster are selected based on how well they match the wrapper tree for the cluster, and the wrapper tree is adjusted based on the selected web pages of the cluster. The generate wrappers component invokes a convert document to wrapper component 535, a move matching documents to cluster component 536, a move near matching documents to cluster component 537, a calculate distance component 538, and an adjust wrappers component 539. The convert document to wrapper component converts a document tree of the training data to a wrapper tree. The move matching documents to cluster component identifies document trees of the training data that match the current wrapper tree for the cluster and moves those identified document trees to the cluster. The move near matching documents to cluster component identifies document trees of the training data that nearly match the current wrapper tree for the cluster, moves those identified document trees to the cluster, and adjusts the wrapper tree for the cluster based on those identified document trees. The calculate distance component calculates the distance between a document tree and a wrapper tree to determine how closely the document tree matches. The adjust wrappers component merges two wrapper trees to effect the dynamic adjusting of the wrapper tree of a cluster when a new document tree is added to the cluster. After the generate wrappers component clusters the web pages, it stores the dynamically generated wrapper tree for each cluster in the wrapper store. The wrapper generation system also includes a select wrapper component 540. The select wrapper component receives a web page, generates a document tree for the web page, identifies a wrapper tree of the wrapper store that is closest to the tree, and extracts data from the web page using the wrapper for the identified wrapper tree.

The computing devices on which the wrapper generation system may be implemented may include a central processing unit, memory, input devices (e.g., keyboard and pointing devices), output devices (e.g., display devices), and storage devices (e.g., disk drives). The physical memory and storage devices are computer-readable media that may contain instructions and data structures that implement the wrapper generation system. In addition, the data structures and instruction may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the wrapper generation system may be implemented and used in various operating environments that include personal computers, server computers, multiprocessor systems, microprocessor-based systems, network PCs, minicomputers, mainframe computers, distributed computing environments that include any of the above systems or devices, and so on. The user computing devices may include cell phones, personal digital assistants, smart phones, personal computers, programmable consumer electronics, digital cameras, and so on.

The wrapper generation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The documents used by the wrapper generation system may include any hierarchically organized documents such as web pages, XML-based documents, HTML-based documents, and so on.

Figure 6:
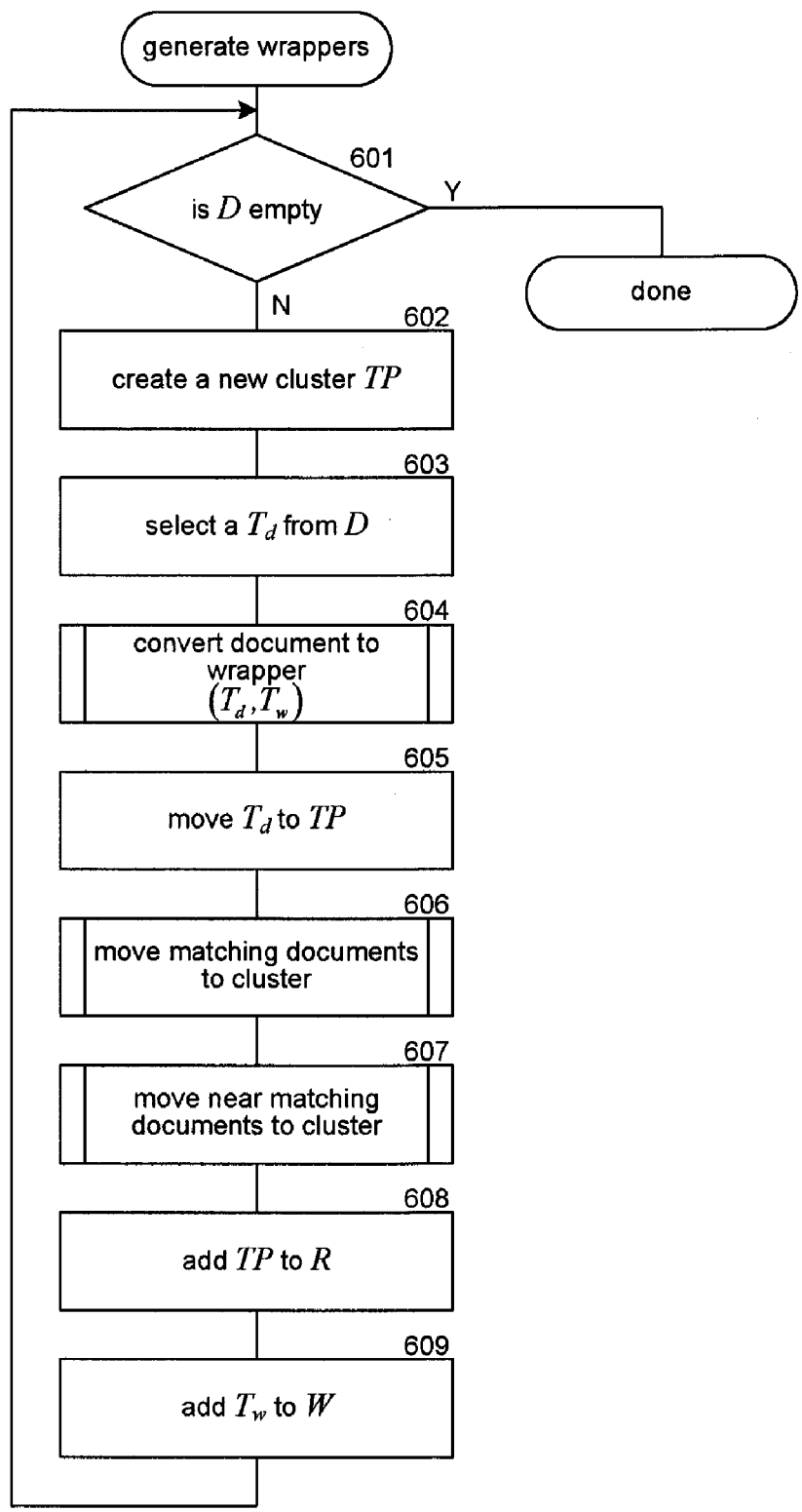
FIG. 6 is a flow diagram that illustrates the processing of the generate wrappers component of the wrapper generation system in one embodiment.

FIG. 6 is a flow diagram that illustrates the processing of the generate wrappers component of the wrapper generation system in one embodiment. The component dynamically clusters web pages with similar templates and dynamically generates a wrapper tree for each cluster of web pages. The component initially starts with all the document trees of the training data in a training collection D. In blocks 601-609, the component loops identifying clusters of web pages and dynamically adjusting the wrapper tree of a cluster. In decision block 601, if the training collection is empty, then the component completes, else the component continues at block 602. In block 602, the component creates a new cluster TP. In block 603, the component selects a document tree $T_d$ from the collection as the first document tree of the cluster. In one embodiment, the component selects the document tree randomly. In block 604, the component invokes the convert document to wrapper component to convert the selected document tree $T_d$ to the initial wrapper tree $T_w$ of the new cluster TP. In block 605, the component moves the selected document tree $T_d$ from the collection D to the new cluster TP. In block 606, the component invokes the move matching documents to cluster component to move the document trees that match the initial wrapper tree from the collection D to the new cluster TP. In block 607, the component invokes the move near matching documents to cluster component to move the document trees that nearly match the wrapper tree as adjusted from the collection D to the new cluster TP and to adjust the wrapper tree based on the moved documents. In block 608, the component adds the cluster TP to the collection of clusters R. In block 609, the component adds the wrapper tree $T_w$ to the collection of wrapper trees W. The component then loops to block 601 to continue identifying clusters.

Figure 7:
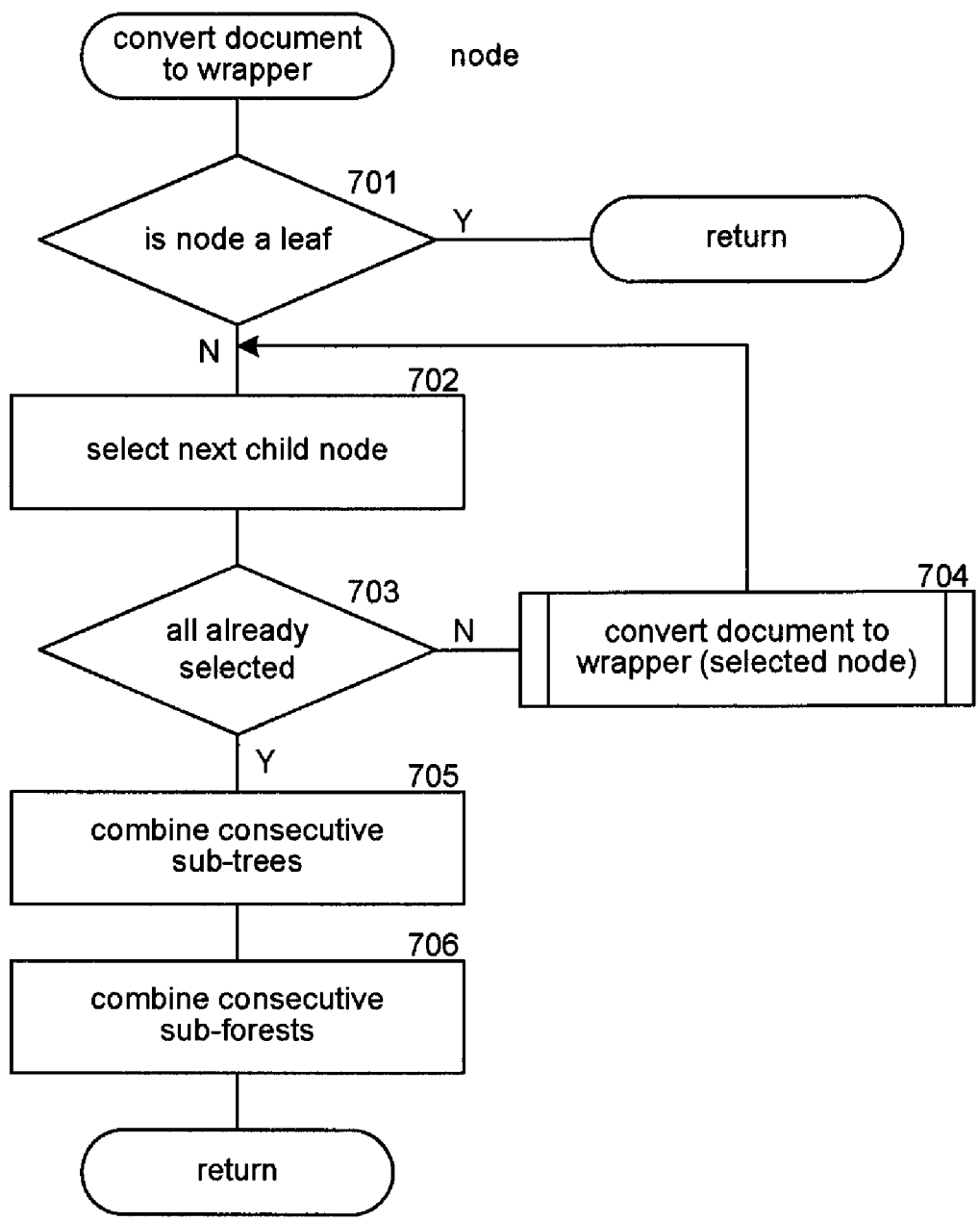
FIG. 7 is a flow diagram that illustrates the processing of the convert document to wrapper component of the wrapper generation system in one embodiment.

FIG. 7 is a flow diagram that illustrates the processing of the convert document to wrapper component of the wrapper generation system in one embodiment. The component is passed the root node of a document tree and recursively invokes itself to generate a wrapper tree. Although the component is illustrated as being recursive, one skilled in the art will appreciate that the component may alternatively be implemented in a non-recursive manner. In decision block 701, if the passed node is a leaf node, then the component returns, else the component continues at block 702. In blocks 702-704, the component loops selecting each child node of the passed node and recursively invoking the component. In block 702, the component selects the next child node of the passed node. In decision block 703, if all the child nodes have already been selected, then the component continues at block 705, else the component continues at block 704. In block 704, the component recursively invokes the convert document to wrapper component passing the selected node and then loops to block 702 to select the next child node. In block 705, the component combines consecutive sub-trees of the passed node. In block 706, the component combines consecutive sub-forests of the passed node. The component then returns.

Figure 8:
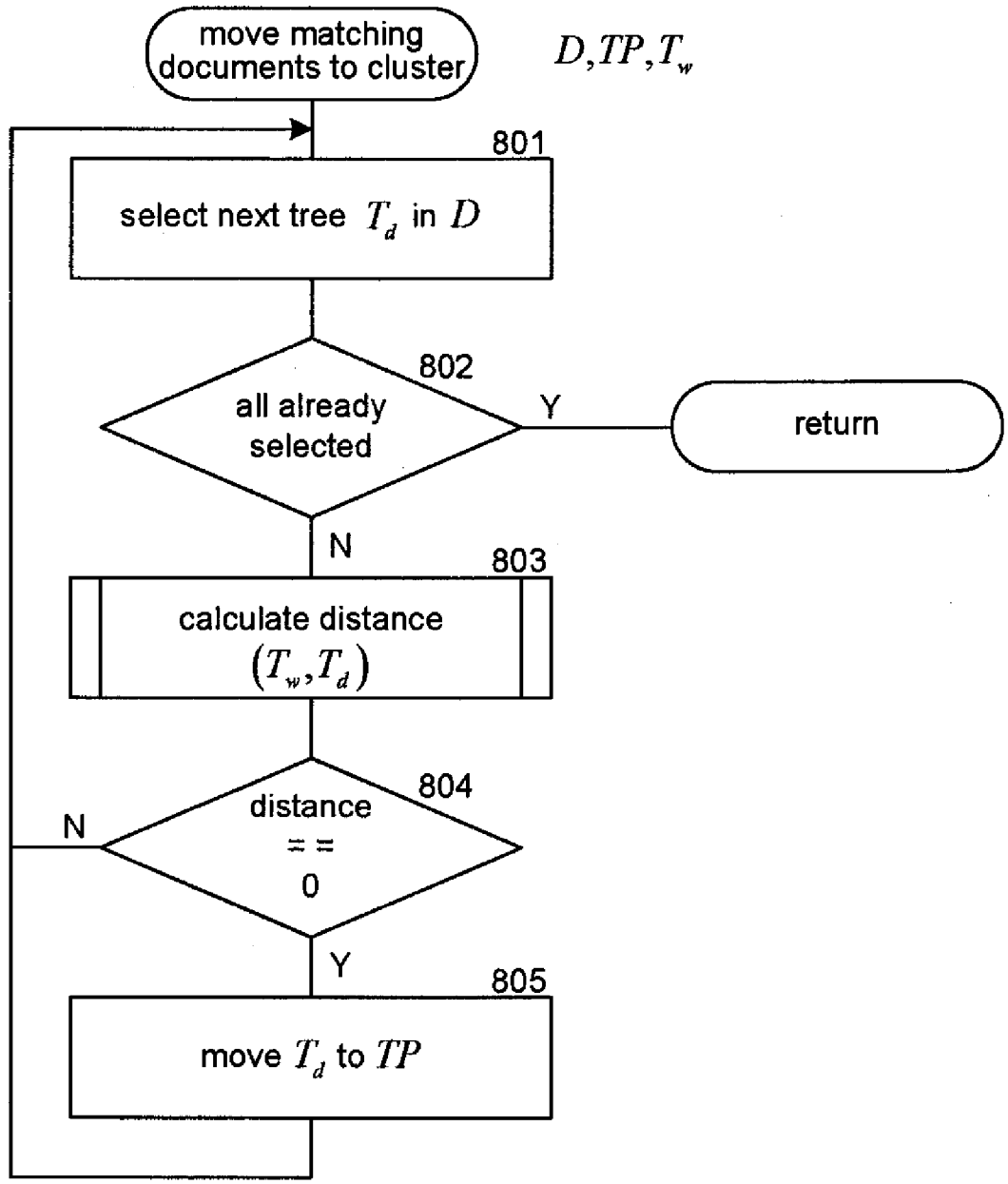
FIG. 8 is a flow diagram illustrating the processing of the move matching documents to cluster component of the wrapper generation system in one embodiment.

FIG. 8 is a flow diagram illustrating the processing of the move matching documents to cluster component of the wrapper generation system in one embodiment. The component moves all document trees $T_d$ of the collection D that match the wrapper tree $T_w$ to the cluster TP. In block 801, the component selects the next document tree $T_d$ of the collection D. In decision block 802, if all the document trees have already been selected, then the component returns, else the component continues at block 803. In block 803, the component invokes the calculate distance component to calculate the distance between the selected document tree $T_d$ and the wrapper tree $T_w$. In decision block 804, if the distance is zero, then the selected document tree matches the wrapper tree and the component continues at block 805, else the component loops to block 801 to select the next document tree. In block 805, the component moves the selected document tree $T_d$ to the cluster TP and then loops to block 801 to select the next document tree.

Figure 9:
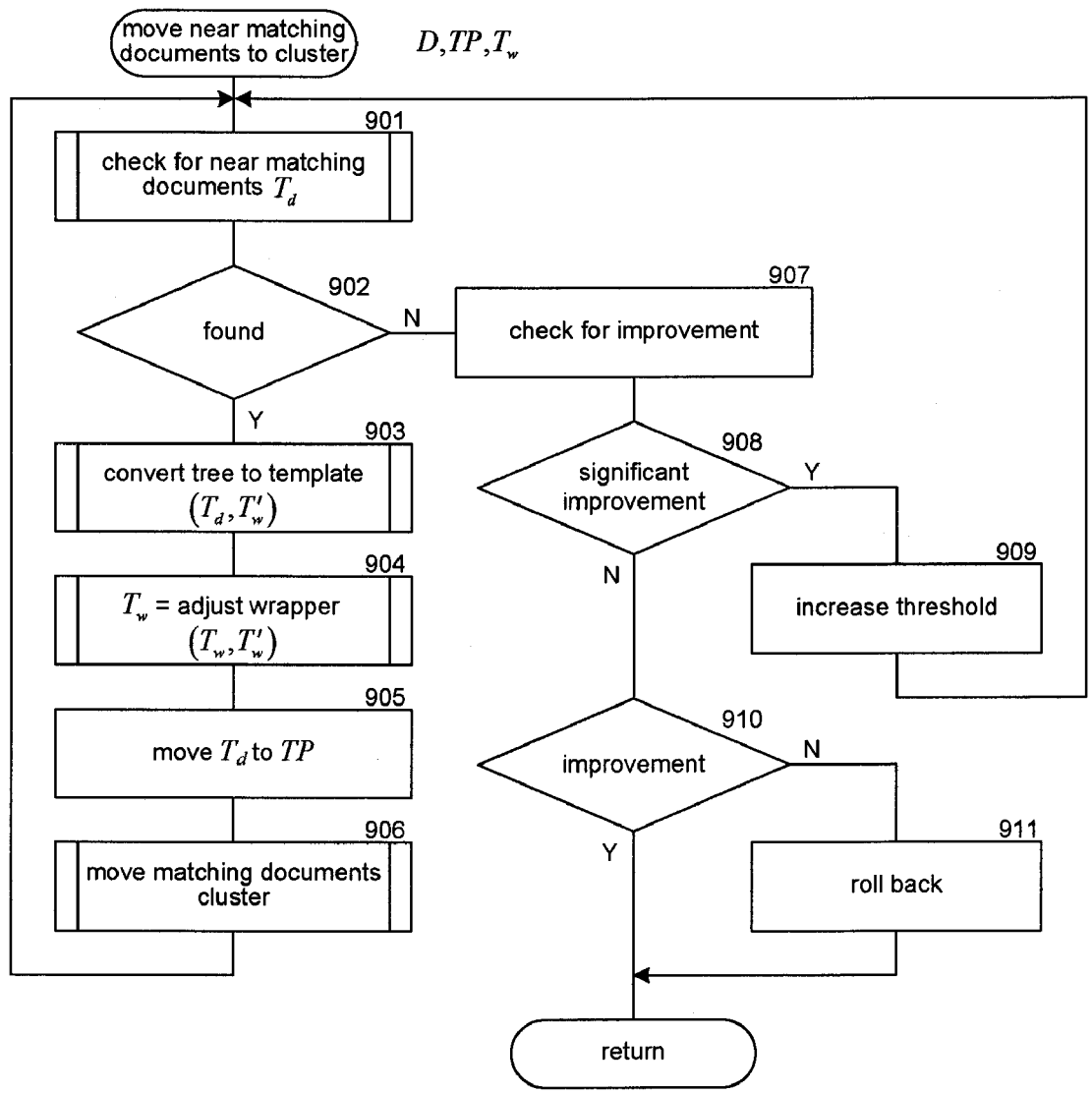
FIG. 9 is a flow diagram that illustrates the processing of the move near matching documents to cluster component of the wrapper generation system in one embodiment.

FIG. 9 is a flow diagram that illustrates the processing of the move near matching documents to cluster component of the wrapper generation system in one embodiment. The component moves a document tree of the collection D that nearly matches the wrapper tree $T_w$ to the cluster TP and dynamically adjusts the wrapper tree. The component repeats the processing until no document tree in the collection nearly matches the adjusted wrapper tree. In blocks 901-906, the component loops moving nearly matching document trees to the cluster. In block 901, the component invokes the check for near matching document component to determine whether a document tree $T_d$ nearly matches the wrapper tree $T_w$. In decision block 902, if a nearly matching document tree was found, then the component continues at block 903, else the component continues at block 907. In block 903, the component invokes the convert document to wrapper component to convert the near matching document tree to a wrapper tree $T_w'$. In block 904, the component invokes the adjust wrappers component to adjust the wrapper tree $T_w$ based on the wrapper tree $T_w'$ generated from the document tree to be added to the cluster. In block 905, the component moves the document tree $T_d$ from the collection D to the cluster TP. In block 906, the component invokes the move matching documents to cluster component to move any document trees of the collection that match the adjusted wrapper tree to the cluster. The component then loops to block 901 to check for more document trees that nearly match the adjusted wrapper tree.

In blocks 907-911, the component implements an adaptive threshold for moving document trees to clusters. If the component used a fixed threshold, then the component would return rather than continue at block 907. In block 907, the component determines whether the current threshold resulted in an improved wrapper tree over the wrapper tree generated using the previous threshold. In decision block 908, if improvement was significant, then the component increases the threshold in block 909 and loops to block 901 to move document trees to the cluster based on the increased threshold. If, however, the improvement was not significant, then the component continues at block 910. In decision block 910, if there was an improvement, then the component returns, else the component continues at block 911. In block 911, the component rolls back the effect of moving document trees for the current threshold which resulted in no improvement and then returns.

Figure 10:
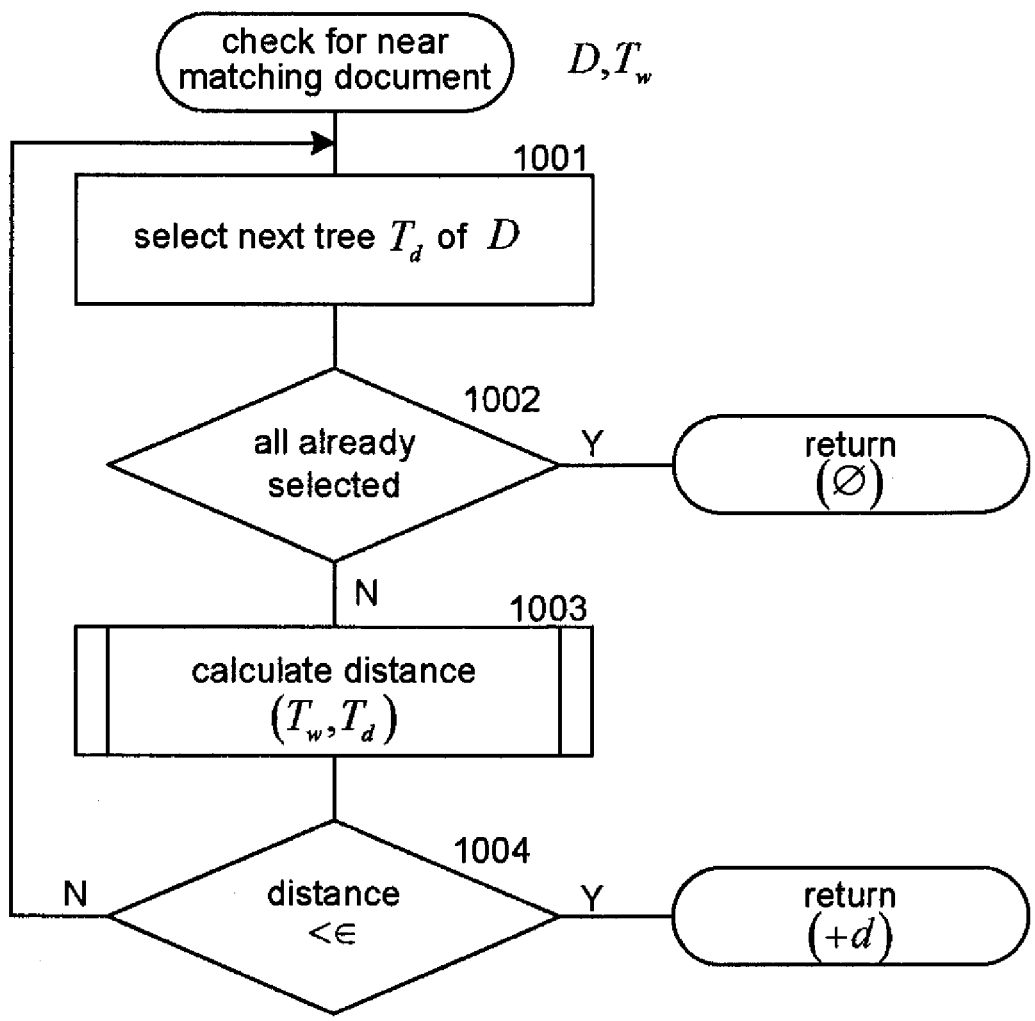
FIG. 10 is a flow diagram that illustrates the processing of the check for near matching document component of the wrapper generation system in one embodiment.

FIG. 10 is a flow diagram that illustrates the processing of the check for near matching document component of the wrapper generation system in one embodiment. The component loops checking the distance between document trees of the collection D and the wrapper tree $T_w$ until a document tree is found that is a near match or it is determined that no document tree matches. In block 1001, the component selects the next document tree $T_d$ of the collection D. In decision block 1002, if all the document trees of the collection have already been selected, then no document tree is a near match and the component returns indicating no near match, else the component continues at block 1003. In block 1003, the component invokes the calculate distance component passing the wrapper tree $T_w$ and the document tree $T_d$ to calculate the distance between the document tree and the wrapper tree. In decision block 1004, if the distance is less than a threshold, then the component returns the document tree indicating a near match, else the component loops to block 1001 to select the next document tree of the collection. Alternatively, the component may return the nearest near matching but not identical document tree, the furthest near matching document tree, or a randomly selected near matching document tree.

Figure 11:
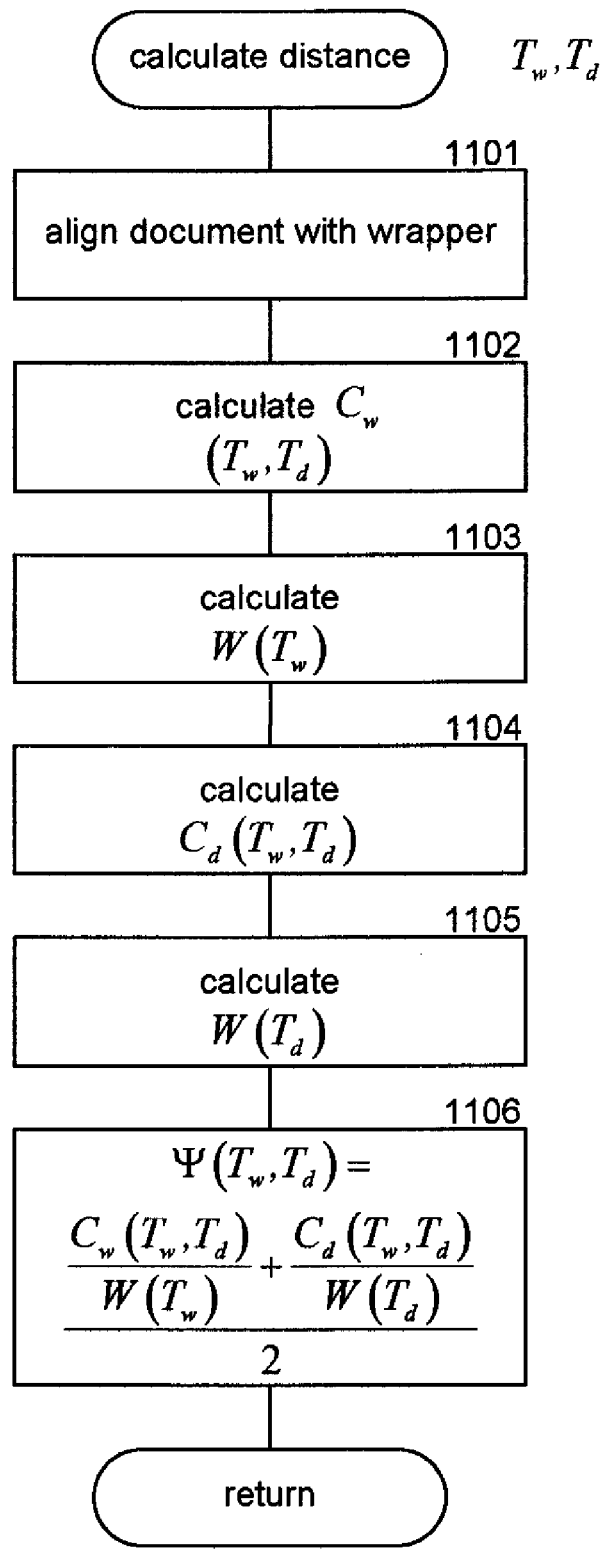
FIG. 11 is a flow diagram that illustrates the processing of the calculate distance component of the wrapper generation system in one embodiment.

FIG. 11 is a flow diagram that illustrates the processing of the calculate distance component of the wrapper generation system in one embodiment. The component is passed a wrapper tree $T_w$ and a document tree $T_d$ and calculates the distance between the wrapper tree and the document tree. In block 1101, the component aligns the document tree with the wrapper tree. In block 1102, the component counts the number of misaligned nodes $C_w$ of the wrapper tree. In block 1103, the component calculates the weight $W(T_w)$ of the wrapper tree. In block 1104, the component counts the number of misaligned nodes $C_d$ of the document tree. In block 1105, the component calculates the weight $W(T_d)$ of the document tree. In block 1106, the component calculates the distance using Equation 5. The component then returns.

Figure 12:
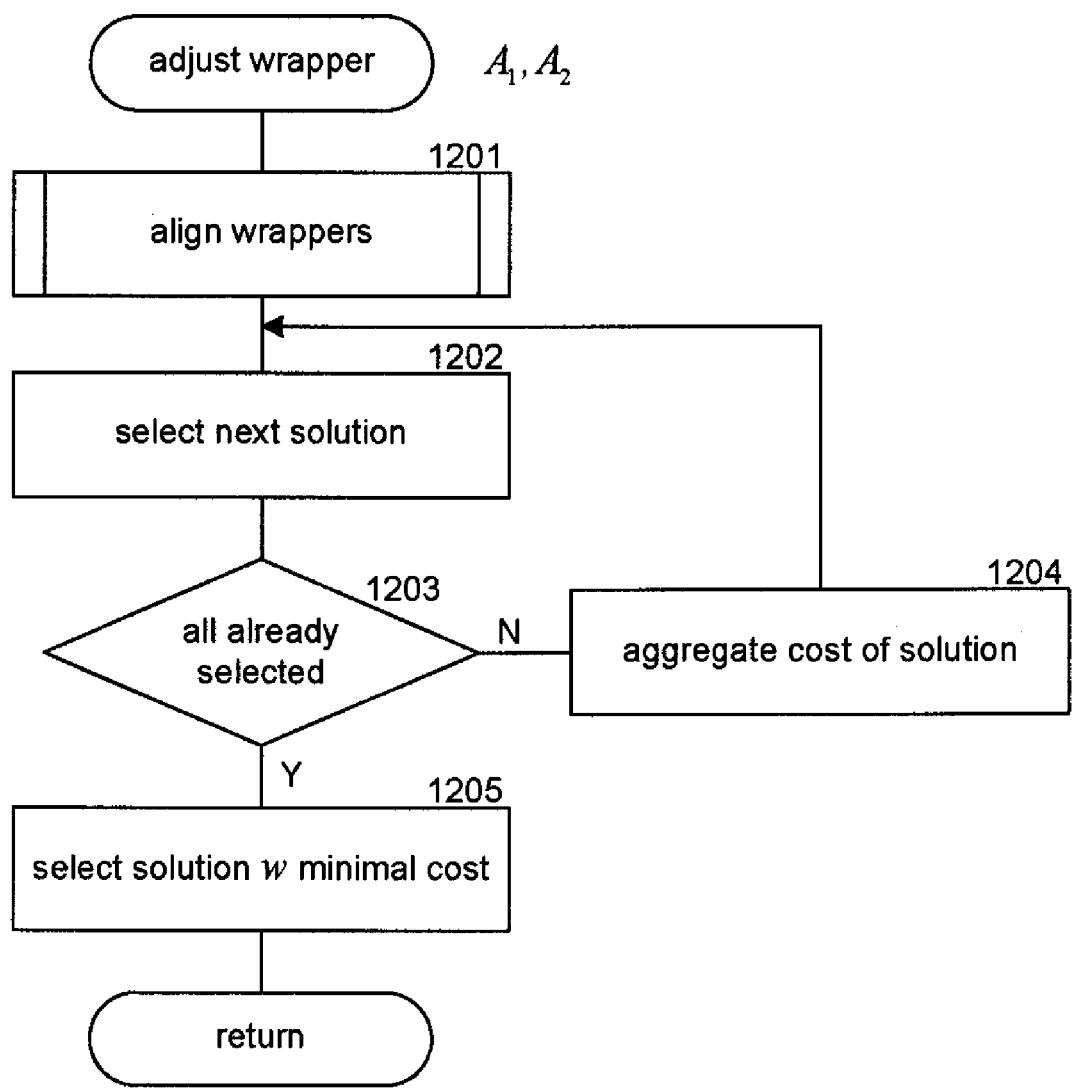
FIG. 12 is a flow diagram that illustrates the processing of the adjust wrapper component of the wrapper generation system in one embodiment.

FIG. 12 is a flow diagram that illustrates the processing of the adjust wrappers component of the wrapper generation system in one embodiment. The component is passed a pair of wrapper trees and merges them into a single wrapper tree. In block 1201, the component invokes an align wrappers component to align the nodes of the wrapper trees. The align wrappers component is a recursive component that tests all possible alignments of sub-trees of the wrapper trees. The component may use dynamic programming techniques to prevent retesting of solutions that have been previously tested. In block 1202, the component selects the next solution for the root nodes of the wrapper trees. In decision block 1203, if all the solutions have already been selected, then the component continues at block 1205, else the component continues at block 1204. In block 1204, the component aggregates the cost of the solution and then loops to block 1202 to select the next solution. In block 1205, the component selects the solution with a minimal cost and then returns.

Figure 13:
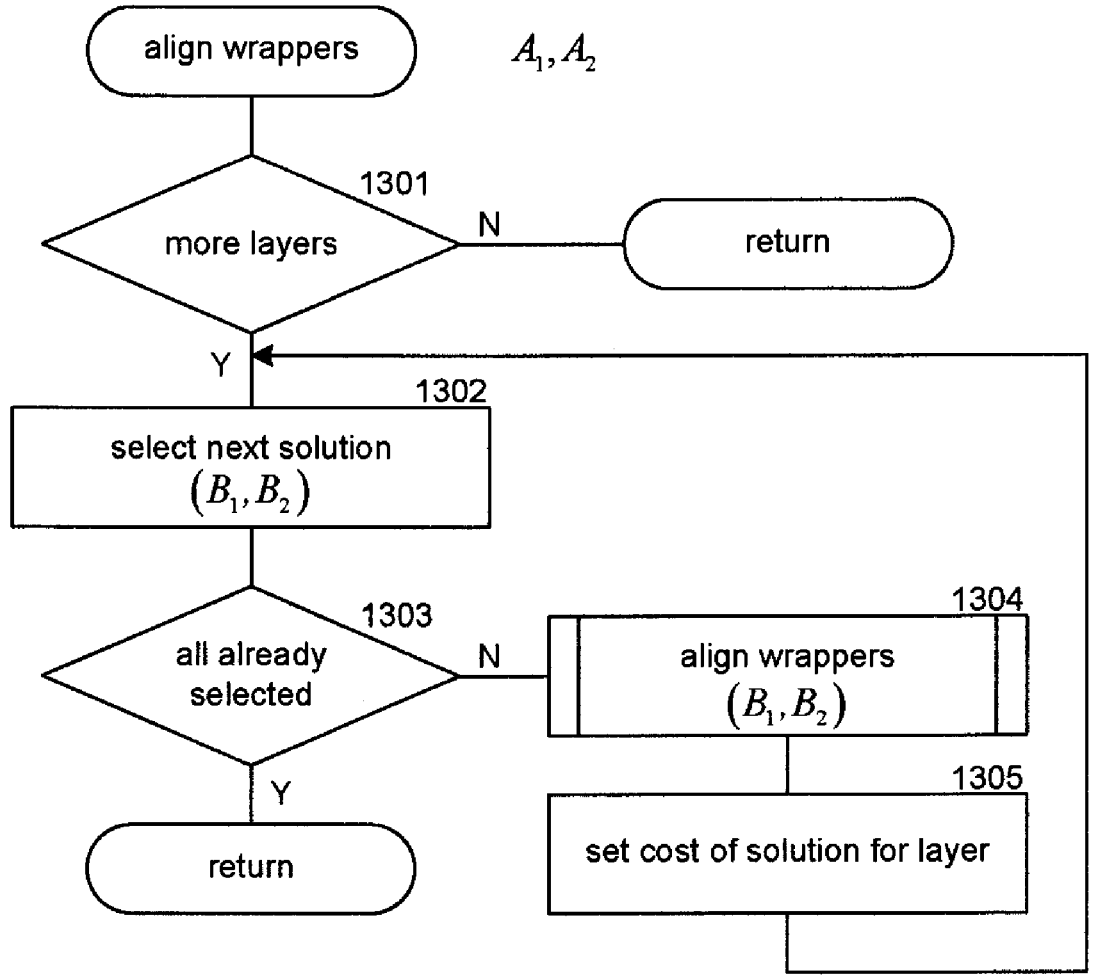
FIG. 13 is a flow diagram that illustrates the processing of the align wrappers component of the wrapper generation system in one embodiment.

FIG. 13 is a flow diagram that illustrates the processing of the align wrappers component of the wrapper generation system in one embodiment. The component is invoked recursively to determine the cost for all possible solutions. In decision block 1301, if there are more layers of both wrapper trees, then the component continues at block 1302, else the component returns. In blocks 1302-1305, the component loops selecting new solutions and recursively invoking the align wrappers component. In block 1302, the component selects the next solution for the current layer. In decision block 1303, if all the solutions have already been selected, then the component returns, else the component continues at block 1304. In block 1304, the component invokes the align wrappers component recursively to align the nodes for the next layer of the wrapper trees. In block 1305, the component sets the cost of the selected solution for the layer and then loops to block 1302 to select the next solution.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device with a processor and a memory for generating wrappers for hierarchically organized documents, each document having a document tree with nodes, the method comprising:
   generating by the processor, for each of a plurality of clusters of documents, a wrapper by repeating the following until all the documents have been selected:
      selecting a document that has not yet been selected for creation of a wrapper tree having nodes;
      creating the wrapper tree for the document tree of the selected document;
      for each document whose distance from its document tree to the wrapper tree is within a threshold distance, selecting the document; and
         adjusting the wrapper tree based on the document tree of the selected document; and
      establishing the wrapper for the documents selected for creation and adjustment of the wrapper tree based on the adjusted wrapper tree
   wherein a wrapper tree is created and adjusted for each cluster of documents whose document trees are within a threshold distance of the wrapper tree at the time of selection of the document, and
   wherein distance is represented by the following equation:

$$\Psi(T_w, T_d) = \left( \frac{C_w(T_w, T_d)}{W(T_w)} + \frac{C_d(T_w, T_d)}{W(T_w)} \right) / 2 \qquad (3)$$

where $\Psi(T_w, T_d)$ represents the distance between wrapper tree $T_w$ and document tree $T_d$, $C_w(T_w, T_d)$ represents count of nodes of the wrapper tree $T_w$ that do not match document nodes of document tree $T_d$, $C_d(T_w, T_d)$ represents count of nodes of document tree $T_d$ that do not match wrapper nodes of the wrapper tree $T_w$, and $W(T_w)$ represents a weight of wrapper tree $T_w$.

2. The method of claim 1 wherein the adjusting of the wrapper tree includes merging a wrapper tree for the selected document tree and the created wrapper tree.

3. The method of claim 2 wherein the creating of a wrapper tree for a document tree includes combining consecutive sub-forests of nodes within the document tree.

4. The method of claim 1 wherein when multiple wrapper trees have been generated, identifying a wrapper to use for extracting data from a document tree based on distance between the document tree and the wrapper trees.

5. The method of claim 1 wherein the threshold distance is adaptive.

6. The method of claim 5 wherein the threshold distance is increased after each adjustment until the adjusting of the wrapper tree based on a document selected because of the increased threshold distance results in an adjusted wrapper tree whose effectiveness is reduced compared to the effectiveness of the wrapper before the adjustment.

7. A computing system with a processor and a memory that determines similarity between a hierarchically organized document and a wrapper tree, the document having a document tree, the system comprising:
   components implemented as instructions stored in memory for execution by the processor that include:
      a component that aligns nodes of the document tree with nodes of the wrapper tree; and
      a component that generates a metric from the number of misaligned nodes, the metric indicating similarity between the document tree and the wrapper tree
   wherein the metric is represented by the following equation:

$$\Psi(T_w, T_d) = \left( \frac{C_w(T_w, T_d)}{W(T_w)} + \frac{C_d(T_w, T_d)}{W(T_w)} \right) / 2 \qquad (3)$$

where $\Psi(T_w, T_d)$ represents the metric between wrapper tree $T_w$ and document tree $T_d$, $C_w(T_w, T_d)$ represents count of nodes of the wrapper tree $T_w$ that do not match document nodes of document tree $T_d$, $C_d(T_w, T_d)$ represents count of nodes of document tree $T_d$ that do not match wrapper nodes of the wrapper tree $T_w$, and $W(T_w)$ represents a weight of wrapper tree $T_w$.

8. A computer-readable storage medium containing instructions for controlling a computing system to generate wrapper trees for document trees, the document trees and wrapper trees having nodes, comprising:
   for each of a plurality of wrapper trees,
      selecting a document tree that has not been previously selected;
      creating the wrapper tree for the selected document tree; and
      when there exists an unselected document tree whose distance from the wrapper tree is less than a threshold distance, selecting the document tree and adjusting the wrapper tree based on the selected document tree
   wherein each wrapper tree represents a wrapper for a cluster of documents whose document tree is within a threshold distance of the wrapper tree before the wrapper tree is adjusted, and
   wherein distance is represented by the following equation:

$$\Psi(T_w, T_d) = \left( \frac{C_w(T_w, T_d)}{W(T_w)} + \frac{C_d(T_w, T_d)}{W(T_w)} \right) / 2 \qquad (3)$$

where $\Psi(T_w, T_d)$ represents the distance between wrapper tree $T_w$ and document tree $T_d$, $C_w(T_w, T_d)$ represents count of nodes of the wrapper tree $T_w$ that do not match document nodes of document tree $T_d$, $C_d(T_w, T_d)$ represents count of nodes of document tree $T_d$ that do not match wrapper nodes of the wrapper tree $T_w$, and $W(T_w)$ represents a weight of wrapper tree $T_w$.

9. The computer-readable storage medium of claim 8 wherein when the distance is zero, selecting the document tree without adjusting the wrapper tree.

10. The computer-readable storage medium of claim 9 wherein the selected document trees for a wrapper tree form a cluster of document trees.

11. The computer-readable storage medium of claim 8 including extracting data from a document by identifying the wrapper tree whose distance from a document tree of the document is smallest and using the identified wrapper tree as a template for extracting data from the document.

* * * * *

UNITED STATES PATENT AND TRADEMARK OFFICE
CERTIFICATE OF CORRECTION

PATENT NO. : 7,660,804 B2            Page 1 of 1
APPLICATION NO. : 11/465026
DATED : February 9, 2010
INVENTOR(S) : Wen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 274 days.

Signed and Sealed this

Thirtieth Day of November, 2010

David J. Kappos
*Director of the United States Patent and Trademark Office*